Dec. 25, 1951   H. J. BUTLER   2,580,001
AIR COOLING APPARATUS FOR VEHICLE WHEELS
Filed Sept. 20, 1949   3 Sheets-Sheet 1

INVENTOR
Henry James Butler
by Benj. T. Rauber
his Attorney

Dec. 25, 1951  H. J. BUTLER  2,580,001
AIR COOLING APPARATUS FOR VEHICLE WHEELS
Filed Sept. 20, 1949  3 Sheets-Sheet 2

Dec. 25, 1951   H. J. BUTLER   2,580,001
AIR COOLING APPARATUS FOR VEHICLE WHEELS
Filed Sept. 20, 1949   3 Sheets-Sheet 3

INVENTOR
Henry James Butler
by his attorney

Patented Dec. 25, 1951

2,580,001

UNITED STATES PATENT OFFICE 2,580,001

AIR-COOLING APPARATUS FOR VEHICLE WHEELS

Henry James Butler, Sutton Coldfield, England, assignor to Dunlop Rubber Company Limited, a British company Application September 20, 1949, Serial No. 116,707
In Great Britain September 23, 1948

8 Claims. (Cl. 188—264)

1

This invention relates to air cooling means for vehicles, particularly for aircraft and, more particularly, for directing a stream of cooling air to the space within a wheel hub for cooling brakes or other heat generating elements associated therewith.

One of the major difficulties encountered by designers of aircraft braking systems is that of dissipating heat caused by the application of the brakes on landing, since excessive rise of brake temperature renders the brakes unreliable or even inoperative.

One method employed for accelerating this dissipation of heat consists of increasing the outer surface of the brake drum, for instance by grooving, so that the heat is conducted away more rapidly. Similarly, where disc brakes are employed, the discs may be grooved, or they may be provided with friction facings of air-permeable material. With this method of brake cooling it is necessary to allow air to flow through the interior of the wheel, the rate of cooling depending substantially upon the volume of air flowing through the wheel.

My present invention provides improvements in supplying a stream of cooling air to the hub of an aircraft wheel when the aircraft is landing.

According to the invention a cooling system for aircraft wheels comprises an air deflector attached to a non-rotatable portion of the wheel assembly such as the axle and movable between a closed position in which it lies substantially flush with the wheel rim and an open position in which it is adapted to deflect air into the wheel during forward movement of the aircraft.

In one construction, a cooling system for aircraft wheel brakes comprises a disc of substantially the same diameter as the wheel rim, lying flush with said rim and secured to the outer extremity of the non-rotating axle, the forward portion of said disc being adapted to project outwardly from said wheel from a line normal to the direction of movement of the aircraft, thereby deflecting air into the interior of the wheel.

In another construction, also within the scope of the invention, a braking system for aircraft comprises an air scoop composed of a plurality of plates nesting within one another flush with the wheel and adapted to be opened by means under the control of the operator and to present a substantially scoop-like surface to the direction of movement of the aircraft, thereby deflecting air into the interior of the wheel.

In order that the invention may be more fully

2 described reference is made to the accompanying drawings, in which:

Fig. 6 is a perspective view of a retractable oleo-strut and wheel showing a combined fairing and deflector in the opening position.

Fig. 7 is a diagrammatic plan view of the wheel and fairing.

Figure 1:
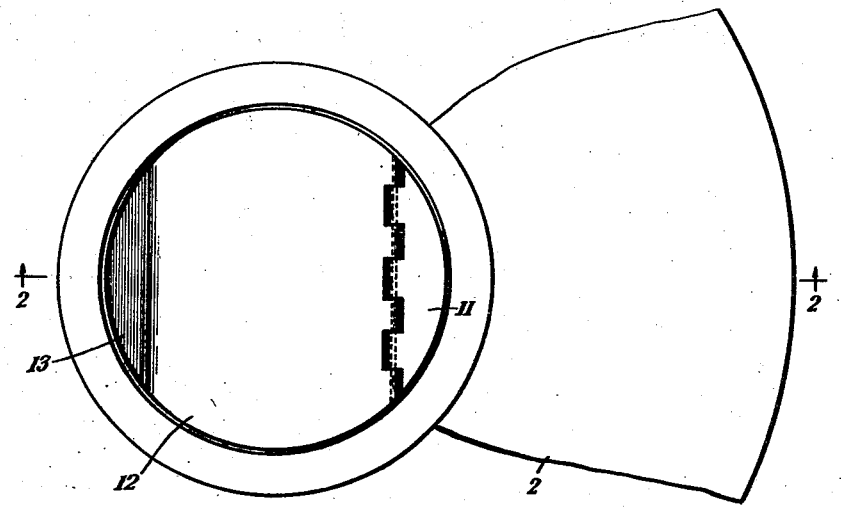
Fig. 1 is a part side view of an aircraft wheel and tyre assembly showing an air deflector made in accordance with one embodiment of the invention.
Figure 2:
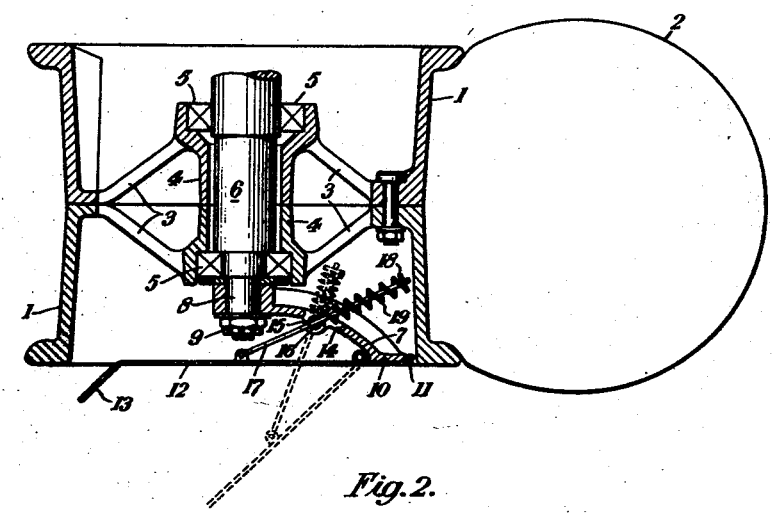
Fig. 2 is a section through 2—2 of Fig. 1 showing in dotted lines the air deflector in the open position.

In one embodiment of the invention (Figs. 1 and 2) the wheel comprises a rim 1 seating a tyre 2 and connected by radially-extending spokes 3 to a hub 4. The hub is rotatably mounted on bearings 5 on a non-rotatable axle 6 secured to the bottom of an oleo-strut or the like. The width of the hub is approximately one half the width of the rim and the centres of both parts lie on the median plane of the wheel.

A substantially T-shaped member is provided, comprising a curved radial member 7 having arms 10 at right angles thereto at its outer extremity. Said radial member 7 has at one end a hole through which is fitted a portion of the axle 8 of reduced diameter which projects beyond the end of the hub. The end of the radial member 7 is non-rotatably secured on the portion 8 by a nut or like means 9 and said radial member is curved outwardly from the centre of the wheel to a location flush with the side of the wheel and spaced a short distance away from the edge of the rim, and this end of the member is provided integrally with the arms 10 at right angles thereto which extend in both directions flush with the side of the wheel to locations adjacent the rim and constitute, in effect, a chord to the circle provided by the rim of the wheel. The radial member 7 is so positioned that the arms 10 are at right angles to the longitudinal axis of the aircraft when the wheel is in the landing position and are on the rearward side of the wheel axle.

Two metal plates 11 and 12 are provided. The smaller plate 11 is segmental in shape and is secured to the arms of the T-shaped member, its curved periphery just clearing the rim. Hinged to the straight portion of the plate is another plate 12 which covers the remainder of the inner periphery of the wheel, its outer periphery just clearing the inner periphery of the rim. This larger plate has a segmental portion 13 inclined away from the wheel, the chord subtending said portion being parallel with the arms of the T-shaped member and diametrically opposite to them.

The radially extending member 7 is provided centrally with a rectangular slot 14, the major axis of which extends parallel to the axis of the member. The two longer sides of the slot are each provided with a boss 15 and extending through holes in the bosses runs a spindle 16 which is free to rotate in said holes and is prevented from endwise movement by split pins or the like. An operating rod 17 is pivotally secured at one end to a lug secured to the inside of the larger plate 12 at approximately its centre and said rod is slidably fitted through a hole extending diametrically through the spindle. An end cap 18 is secured to the end of the operating rod remote from the plate 12 and a helical spring 19 is interposed between the end cap and the spindle.

This device, which is fitted to the retractable wheel of an aircraft landing gear, operates as follows. When the wheel is in the retracted position the pivotable plate 12 is held in the closed position by the spring. As soon as the wheel is in the landing position the slipstream, acting on the outwardly inclined portion 13 of the plate 12, forces said plate to swing outwardly against the spring means to the full extent permitted by the rod 17. A substantial volume of air will then be deflected into the wheel and, passing axially through the wheel and between the spokes, impinges on a brake drum or discs, as the case may be, suitably mounted in the path of the air stream and serves to cool the brake elements, not shown, before passing out of the wheel at its other side. As soon as the aircraft slows down, and the force of the slipstream is insufficient to keep the plate open, it will close automatically under the action of the spring. The invention may be used to cool any type of brake or other heat generating apparatus and, of itself, need have substantially no appreciable braking effect and is generally not relied on for any such effect.

Another embodiment of this invention, which operates in a similar manner to that just described, comprises a single disc lying flush with the outside of said rim and adapted to pivot about the non-rotating hub on a line at right angles to the direction of flight of the aircraft when the undercarriage is lowered. The forward half of the disc has an outwardly inclined portion similar to that previously described, and the disc is also provided with a stop to restrict its pivoting movement and a spring to return it to the closed position.

In a further embodiment of this invention, the rear plate is secured to the hub in the manner described in the first embodiment, and is further provided with two straight arms of equal length projecting forward of said plate at right angles to its basal edge. A forward plate having two straight portions each equal to the length of the arms of the rear plate, the remaining portion being curved, is hinged about its larger axis to the basal edge of the rear member. Collapsible side walls, giving a bellows like effect, are provided between the straight portions of the forward plate and the projecting arms of the rear plate, a spring also being provided to close the forward plate when the aircraft is stationary or the wheel retracted.

The slipstream from the landing plane will therefore force the forward plate open against the force of the spring to the maximum extent permitted by the collapsible side walls, the whole arrangement acting as a scoop to direct a large volume of air into the wheel, thus conducting heat away from the brakes more rapidly.

Figure 3:
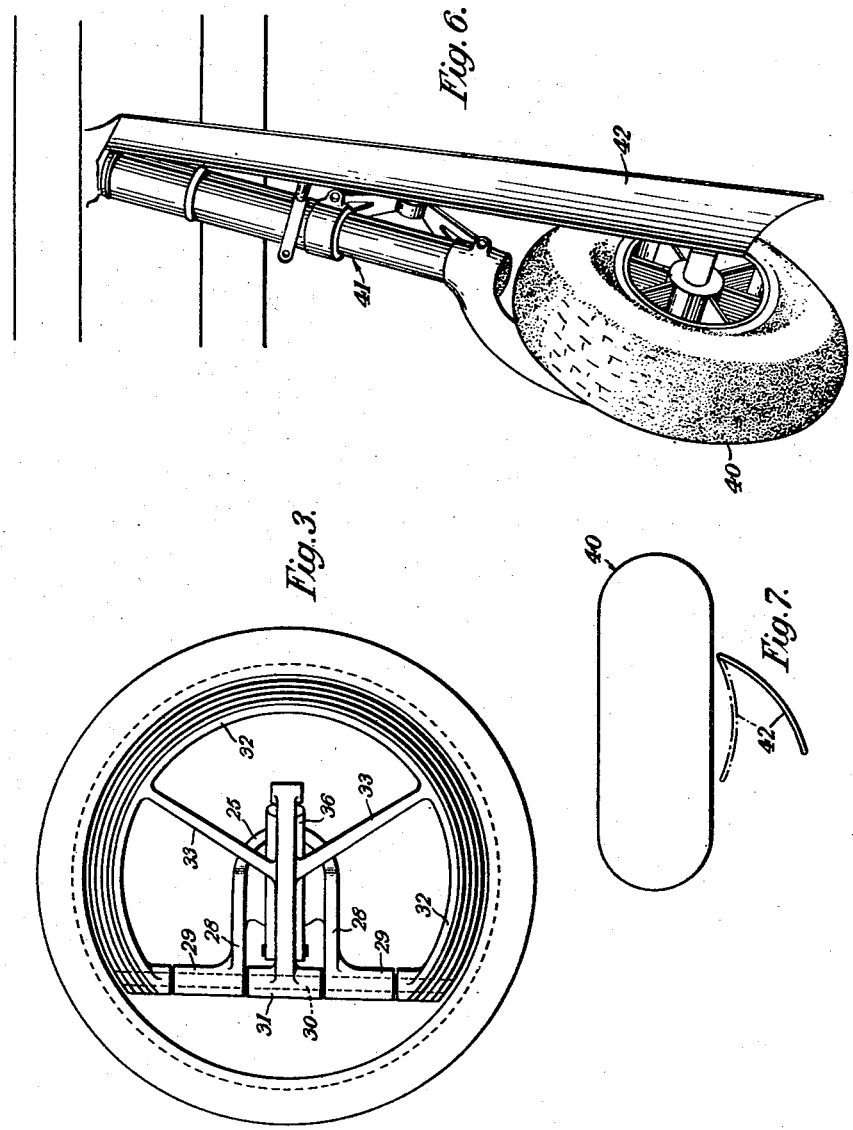
Fig. 3 is a side elevation of an aircraft wheel showing an air deflector made in accordance with another embodiment of the invention.
Figure 4:
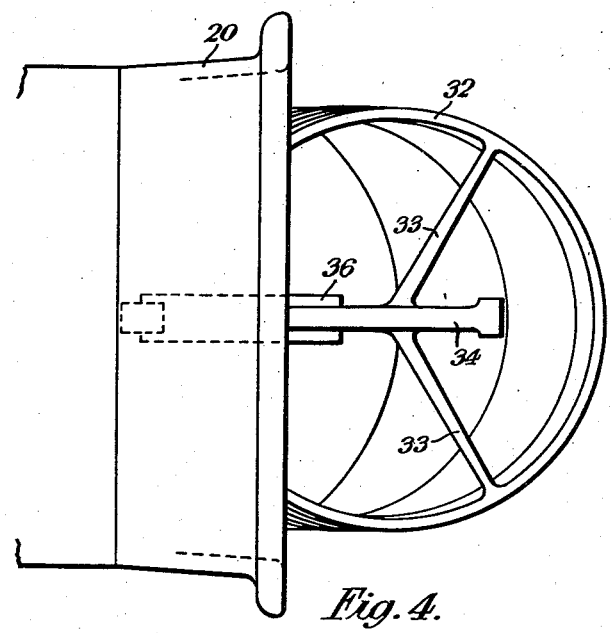
Fig. 4 is a part end elevation of Fig. 3 showing the air deflector in the open position.

In another embodiment of the invention (Figs. 3, 4 and 5) an aircraft wheel comprises a rim 20 adapted to seat a tyre and connected by radially-extending spokes 21 to a hub 22 which is rotatably mounted on bearings 23 on a non-rotatable axle 24. The width of the hub is less than that of the rim and said hub is offset from the median plane of the wheel.

Non-rotatably secured to the end of the axle, and within the wheel, is an angle-bracket which comprises a member 25 threaded on to an extension 26 of the axle and secured thereon by means of a securing nut 27 or the like. Two parallel arms 28, spaced apart the diameter of the axle extension 26, extend at an angle from said member to a location substantially flush with the edge of the wheel and tubular members 29 extend at right angles from the ends of said arms to locations spaced a short distance from the inner periphery of the rim.

Figure 5:
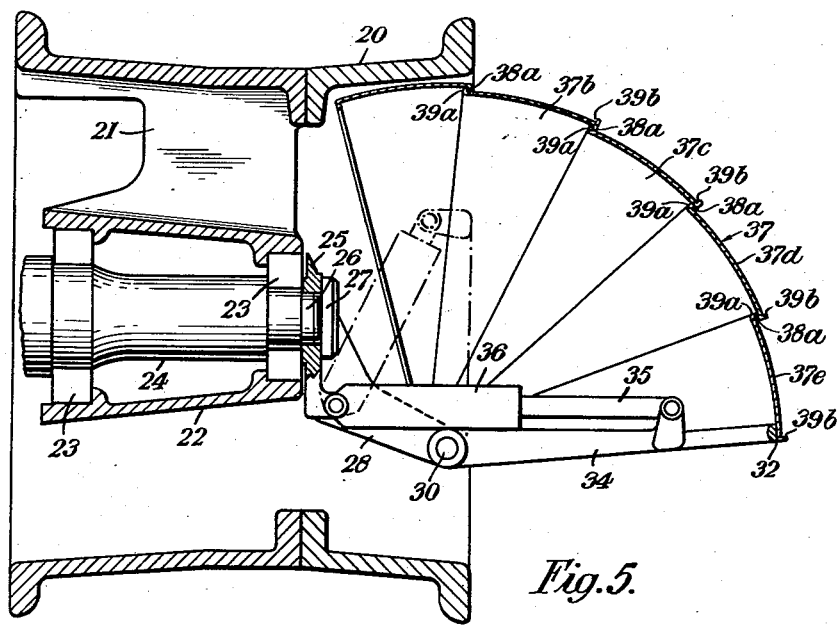
Fig. 5 is a section of the same wheel giving another view of the deflector in the open position.

A spindle 30 is non-rotatably secured through said tubular members and projects from the ends thereof to a location adjacent the rim, and a sleeve 31 is rotatably fitted to the spindle between the tubular members 29. The ends of a part circular hoop 32 are pivotally threaded over said projecting ends of the spindle and said hoop is provided with two inwardly extending radial arms 33 which are secured to an operating member 34 integral with the sleeve and projecting diametrically across the wheel. The end of the operating member remote from the sleeve is pivotably connected to a piston rod 35 which is in turn connected to a piston (not shown) and the piston is slidably fitted in a cylinder 36. The end of the cylinder remote from the piston rod is pivotably connected to the member 25 of the angle bracket. Two ports are provided in the wall of the cylinder, one at each end, for the passage of pressure fluid, and said ports are connected by means of, e. g. flexible hose, to a two-way valve under the control of the pilot. The piston and cylinder mechanism thus comprises, in effect, a two-way jack. By way of illustration Fig. 5 shows, in dotted lines, the jack and operating rod in the "closed" position.

A collapsible scoop 37 is provided, comprising five substantially segmentally shaped plates of equal width, each curved longitudinally to form a part-circle and the two ends of each plate are connected to the ends of the spindle projecting from the ends of the part-circular hoop. The plates are adapted to "nest" one within the other, the outer plate 37a having the largest diameter. Said outer plate is rigidly secured to the ends of the spindle in a permanent position inside the wheel, the outer edges of the plate lying substantially flush with the side of the wheel. The remaining plates are pivotally connected to the spindle and are adapted to open outwardly of the wheel.

The plate having the smallest diameter, i. e.

37e is secured, at its inner periphery and outer edge, to the metal hoop 32. Plates 37a, 37b, 37c and 37d are each provided with a lip 38a extending inwardly from their outer edges and plates 37b, 37c, 37d and 37e are each provided with a lip 39a extending outwardly from their inner edges and also with a lip 39b extending outwardly from their outer edges. Thus when the hoop 32 is swung outwardly it extends the air deflector to a part-spherical form, the lip 39a of one plate engaging with lip 38a of an adjacent plate. When the hoop is swung inwardly the lip 39b engages with lip 38a of an adjacent plate and the scoop collapses within the wheel. The spindle 30 is so disposed within the wheel that it is at right angles to the line of flight when the wheel is in the landing position, and is in the forward half of the wheel.

The device, which may be fitted to either a retractable or non-retractable wheel, operates as follows. On coming in to land the pilot operates a valve under his control and by connecting one of the ports in the piston to a fluid pressure reservoir and the other to exhaust forces the piston and piston rod outwardly of the cylinder. This will cause the operating rod to pivot outwardly of the wheel through about 90°, the cylinder itself pivoting during the process. The operating rod will also cause the hoop to pivot about the spindle and thus will open the scoop to its full extent. The mouth of the scoop is presented towards the line of flight of the aircraft, so that a substantial stream of cooling air will be deflected into the wheel, with beneficial effects on brake cooling. To retract the scoop the valve is operated to close the jack, when the hoop will be pivoted inwardly and the plates will "nest" within the wheel.

As alternative to the first embodiment, the air deflector may be open and closed by a double-acting jack as described in the second embodiment. Thus the hinged plate type of deflector could be used with aircraft having their landing wheels permanently in the "landing" position, in which case the plate 12 could be flat and the operating rod and spring dispensed with.

In yet a further embodiment of the invention (Figs. 6 and 7) a combined fairing and airscoop are provided for a retractable wheel 40 and oleo-strut 41. Said fairing and airscoop, comprises a sheet metal member 42 secured at one end to the top end of the oleo-strut and slidably secured at the other end to a bracket solid with the wheel axle. When the strut is retracted in a recess in the fuselage or wing the member lies flat against the strut and wheel and acts as a partial fairing. When the wheel is lowered to a landing position a small jack is automatically operated by a trigger and forces the leading edge of the member outwardly, thus deflecting air into the wheel.

Certain types of aircraft have wheels provided with mudguards or "spats," and the air deflectors of the first two embodiments may equally well be attached to said mudguards or "spats" instead of to the non-rotating axle of the wheel.

Whilst the air deflectors are herein described and illustrated as being on the side of the wheel remote from the braking elements, this need not necessarily be so. The deflectors may be situated adjacent the braking elements and on either side of the wheel.

Having described my invention, what I claim is:

1. Apparatus for directing a cooling air stream into wheels which comprises a wheel rim, a non-rotating supporting bracket within said rim and a scoop pivoted on said bracket to swing from a position within said rim to a position extending outwardly and forwardly from the rear half of said rim.

2. The apparatus of claim 1 in which said bracket extends to the rear part of said rim and said scoop comprises a plate pivoted at its rear edge to said rearward part of said bracket and extending forwardly thereon to the forward part of said rim.

3. The apparatus of claim 2 in which said plate has an outward projection at its forward edge.

4. The apparatus of claim 2 having a spring to hold said plate within said rim.

5. The apparatus of claim 1 in which said scoop comprises sections of substantially spherical curvature pivoted to swing from a position within said rim and adjacent the rear portion thereof outwardly and forwardly.

6. The apparatus of claim 5 in which said sections interengage to form a continuous scoop surface.

7. The apparatus of claim 5 having a fluid operated means to swing said sections outwardly and forwardly of said rim.

8. Apparatus for directing a cooling air stream into wheels which comprises a wheel rim, a non-rotating bracket having a segment plate within and fitting the rear portion of said rim, and a plate hinged to said segment and extending to the forward part of said rim to swing from said rim outwardly thereof, a spring to hold said plate within said rim and an outward extension of said plate at its forward end.

HENRY JAMES BUTLER.

REFERENCES CITED

The following references are of record in the file of this patent:

UNITED STATES PATENTS

| Number | Name | Date |
| --- | --- | --- |
| 1,806,366 | Pivak | May 19, 1931 |
| 2,042,750 | Halteren | June 2, 1936 |
| 2,106,702 | Campbell | Feb. 1, 1938 |
| 2,205,714 | Doepp | June 25, 1940 |
| 2,207,724 | Diehl | July 16, 1940 |
| 2,248,684 | Levy | July 8, 1941 |
| 2,392,443 | Youngman | Jan. 8, 1946 |

FOREIGN PATENTS

| Number | Country | Date |
| --- | --- | --- |
| 695,110 | Germany | Aug. 16, 1946 |
| 779,937 | France | Apr. 16, 1935 |